(12) United States Patent
Dunn et al.

(10) Patent No.: US 6,484,219 B1
(45) Date of Patent: Nov. 19, 2002

(54) HOST-SPECIFIED USB DEVICE REQUESTS

(75) Inventors: John C. Dunn, Issaquah, WA (US); Kenneth D. Ray, Redmond, WA (US); Firdosh K. Bhesania, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/498,056

(22) Filed: Feb. 4, 2000

(51) Int. Cl.[7] .............................................. G06F 13/42
(52) U.S. Cl. ............................ 710/42; 710/11; 710/313
(58) Field of Search ............................ 710/2–5, 8–11, 710/72–74, 62–63, 305–315

(56) References Cited

U.S. PATENT DOCUMENTS

| | | | | |
|---|---|---|---|---|
| 5,835,791 A | * | 11/1998 | Goff et al. ..................... | 710/62 |
| 6,219,736 B1 | * | 4/2001 | Klingman ................... | 710/129 |
| 6,233,640 B1 | * | 5/2001 | Luke et al. ................. | 710/129 |
| 6,256,687 B1 | * | 7/2001 | Ellis et al. .................... | 710/71 |
| 6,260,084 B1 | * | 7/2001 | Wilson et al. ................. | 710/38 |
| 6,343,260 B1 | * | 1/2002 | Chew .......................... | 702/122 |
| 6,389,495 B1 | * | 5/2002 | Larky et al. ................. | 710/129 |
| 6,389,560 B1 | * | 5/2002 | Chew .......................... | 714/43 |

FOREIGN PATENT DOCUMENTS

| | | | |
|---|---|---|---|
| WO | 00/59594 | 10/2000 | |
| WO | 0157679 | * 8/2001 | ........... G06F/13/42 |

OTHER PUBLICATIONS

"USB Device Framework", Revision 1.1, Chapter 9, Universal Serial Bus Specification, Sep. 1998.
"Universal Serial Bus Common Class Specification", SystemSoft Corporation, Intel Corporation, Dec. 1997.

* cited by examiner

Primary Examiner—Christopher B. Shin
(74) Attorney, Agent, or Firm—Lee & Hayes, PLLC

(57) ABSTRACT

A USB device is configured to support a non-USB-defined device request that is specific to an application program or operating system. The device request is supported by using a device-specific or vendor-specific request code, which is allowed to vary from device to device. To determine the proper request code, the host performs a GET_DESCRIPTOR device request, specifying a predetermined string descriptor. The requested string descriptor designates the request code to be used in the non-USB-defined device request.

28 Claims, 3 Drawing Sheets

HOST-SPECIFIED USB DEVICE REQUESTS

TECHNICAL FIELD

The following relates to device requests made to USB devices and to methods of implementing device requests that are defined by a host system rather than by the USB standard or by the device itself.

BACKGROUND OF THE INVENTION

The Universal Serial Bus (USB) is a cable bus that supports data exchange between a host computer and a wide range of simultaneously accessible peripheral devices. The attached peripheral devices share USB bandwidth through a host-scheduled, token-based protocol. The bus allows peripherals to be attached, configured, used, and detached while the host and other peripherals are in operation.

The USB is defined by a specification that is approved by a committee of industry representatives. The specification covers all aspects of USB operation, including electrical, mechanical, and communications characteristics. To be called a USB device, a peripheral must conform to this very exacting specification.

One significant feature of USB is that it allows peripheral devices to store information about themselves, and to provide such information upon request to host computers. This avoids the need for the computer, operating system, or application programs to maintain this information for many different devices. Instead, the device stores and provides its own information.

The USB device information is typically stored in so-called "descriptors"—data structures formatted as specified by the USB specification. These descriptors contain information that is primarily related to device controls joysticks, buttons, wheels, sliders, etc.). They describe the type of each control, the format of data generated by the control, the range of values generated by the control, and many other characteristics.

In defining the USB communications protocol, the USB committee attempted to foresee future needs, and to provide ways to accommodate such needs within the existing protocol. In addition, the USB specification is updated from time to time, thereby providing a mechanism for adding further functionality while still retaining backward compatibility.

It was recognized from an early date that certain peripherals might need to define their own descriptors or request codes, relating to new features or technology not encompassed by the USB-defined descriptors. This capability was provided by reserving certain request codes for definition and use by individual peripheral manufacturers.

Request codes are used in a USB system to define "device requests" from a host to a peripheral device. A device request is a data structure that is conveyed in a "control transfer" from the host to the peripheral device. A control transfer contains the following fields:

bmRequestType—a mask field indicating (a) the direction of data transfer in a subsequent phase of the control transfer; (b) a request type (standard, class, vendor, or reserved); and (c) a recipient (device, interface, endpoint, or other). The primary types of requests specified in the "request type" field are the "standard" and "vendor" types, which will be discussed below.

bRequest—a request code indicating one of a plurality of different commands to which the device is responsive.

wValue—a field that varies according to the request specified by bRequest.

wIndex—a field that varies according to request; typically used to pass an index or offset as part of the specified request.

wLength—number of bytes to transfer if there is a subsequent data stage.

All USB devices are supposed to support and respond to "standard" requests-referred to herein as "USB-specific" requests. In a USB-specific request, the request type portion of the bmRequestType field contains a predefined value indicative of the "standard" request type.

Each different USB-specific request has a pre-assigned USB-specific request code, defined in the USB specification. This is the value used in the bRequest field of the device request, to differentiate between different USB-specific requests. For each USB-specific request code, the USB specification sets forth the meanings of wValue and wIndex, as well as the format of any returned data.

USB devices can optionally support "vendor" requests— referred to herein as "device-specific" requests. In a device-specific request, the request type portion of the bmRequest-Type field contains a predefined value to indicate a "vendor" request type.

In the case of device-specific requests, the USB specification does not assign request codes, define the meanings of wValue and wIndex, or define the format of returned data. Rather, each device has nearly complete control over the meaning, functionality, and data format of device-specific requests. Specifically, the device can define its own requests and assign device-specified request codes to them. This allows devices to implement their own device requests for use by host computers, and provides tremendous flexibility for manufacturers of peripherals.

The inventors have discovered a need for a similar feature that would benefit various hosts, application programs, and host operating systems. Specifically, designers of application programs and operating systems would value the opportunity to define their own device requests (and the associated responses), and to have such requests supported in a uniform way by compatible peripherals.

As an example of this need, a co-pending US Patent Application ("System and Method for Mapping Input Device Controls to Software Actions," Ser. No. 09/483,113, filed Jan. 10, 2000), describes a technique in which different controls of a device are arranged in different combinations for use with application programs of different "genres." For each genre, the controls of the device are enumerated along with standard "actions" that are to be initiated in response to the respective controls.

Although such information can be maintained at the host for various different controllers, it would be desirable for each controller to store its own genre information, and to make it available through a predefined USB device request. However, such a device request is not defined by the USB specification.

Ideally, a device request such as this would be defined by the host or by the manufacturer of an operating system that executes on the host, and supported uniformly by peripheral devices. Because of this, the device request might be referred to as a "host-specific" device request—in contrast to "USB-specified" requests and "device specific" requests.

However, the different request types supported in the bmRequestType field of a USB device request do not include a "host" type of request.

One possible solution to this problem would be to simply usurp a vendor-specific request code, and attempt to persuade all device manufacturers to use this request code to initiate an agreed-upon host-specific device request. However, this would not provide backward compatibility in the case that the chosen request code was used in previously manufactured devices for different, vendor-specific requests.

Another possibility might be to work with the USB committee to define a new type of request—possibly including a range of request codes for use by host computers. However, this would be a very long term project, and would not produce results quickly enough to be useful in current host program versions.

Accordingly, the inventors have devised a technique that allows a host system to define and issue host-specific device requests while remaining within the current USB specification and maintaining backward compatibility with previous generations of USB peripheral devices.

SUMMARY

Described below is a technique for implementing a host-specific device request in a USB system. The system includes a USB device that responds to device requests from a host. The device requests include USB-specific device requests with corresponding USB-specified request codes and device-specific device requests with corresponding device-specific request codes. The USB-specific requests include a GET_DESCRIPTOR device request that is initiated with a corresponding GET_DESCRIPTOR request code.

The described technique involves two phases. First, the host uses the GET_DESCRIPTOR device request to obtain the request code that corresponds to the host-specific device request. Second, the host uses the obtained request code to initiate the host-specific device request. The first phase is performed once, while the second phase can be performed many times. During the first stage, signature checking is performed to confirm that the device supports this technique. This ensures backward compatibility with earlier devices.

DETAILED DESCRIPTION

Figure 1:
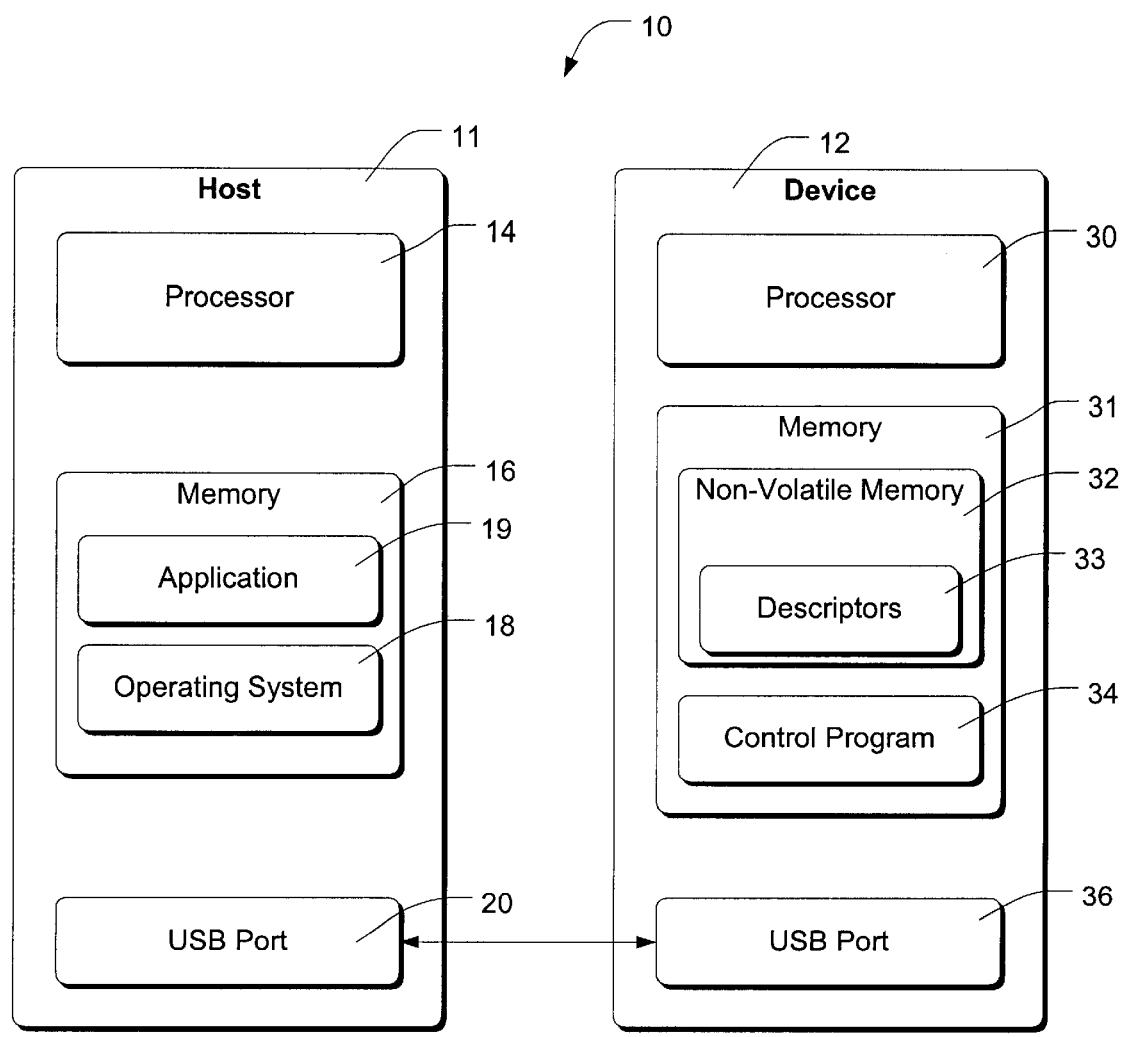
FIG. 1 is a block diagram of a host/peripheral USB system.

FIG. 1 shows a computer system 10 that includes a host computer 11 and a USB peripheral device 12. The host computer is a typical personal computer, but might alternatively be some other type of computer or computer-like device such as a dedicated gaming unit. The USB peripheral device is a device such as a joystick, game pad, steering unit, mouse, stylus, digital speaker, microphone, data storage device, display device, etc.

Host computer 11 has one or more processors 14 and one or more forms of computer-readable memory media 16 such electronic memory, magnetic storage media, optical storage media, or some other type of data storage. Programs are stored in memory 16 from where they are executed by processor 14. In this example, such programs include an operating system 18 and an application program 19.

Host computer 11 also has a USB port 20. The USB port is supported by operating system 18. To communicate with a USB device, application program 19 makes high-level calls to system services provided by operating system 18. The system services take care of lower level communications details, and return requested information to the application program.

USB peripheral device 12 also has one or more processors 30 and one or more forms of computer-readable memory media 31, including at least some form of non-volatile memory media 32. Various USB-related information is stored in the non-volatile memory, such as descriptors 33 that are provided to host 11 upon request. Operating logic in the form of a sequentially-executed program 34 is stored in the memory, from where it is executed by processor 30.

USB device 12 has a USB port 36 connected for communications with USB port 20 of host 11. Communications take place between host 11 and peripheral 12 using conventional USB protocols, and in accordance with the additional techniques described below. Further details regarding the USB and its protocols are available from the USB Implementers Forum, which has current administrative headquarters in Portland, Oregon (current Internet URL: www.usb.org).

USB device 12 responds to USB device requests from host 11. In accordance with the USB specification, such device requests include USB-specified device requests with corresponding USB-specified request codes, and device-specific device requests with corresponding device-specified request codes.

Figure 2:
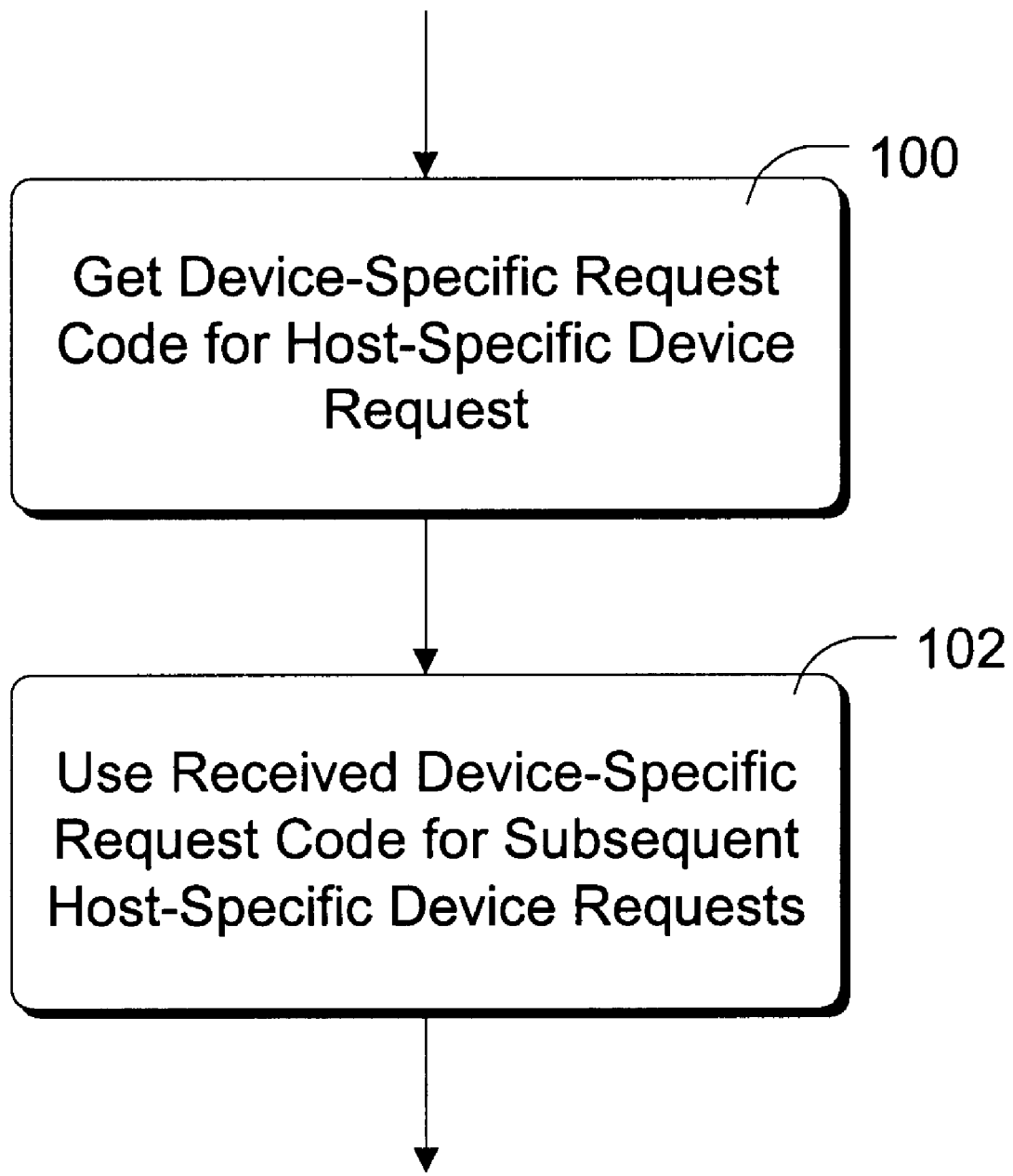
FIGS. 2 and 3 are flowcharts illustrating methodological aspects of the described system.

FIG. 2 shows top-level methodological aspects of the described system. Generally, a new, non-USB-specific device request is defined for use with various USB peripherals. This request is referred to herein as a host-specific device request. Because of the described methodology, the host-specific device request can be defined by the manufacturer of an operating system or application program, and can then be made available to peripheral vendors so that they can support and respond to the newly defined request. As an example, an OS manufacturer might define a new descriptor allowing peripherals to enumerate actions to be performed by various controls when operating with application programs of different genres. This would allow the operating system to use a single device request to obtain this information from various different peripherals (assuming those peripherals are configured to support the new device request).

In an initialization phase 100, the host sends a request to the peripheral in the form of a USB-specified device request. The request is for a device-specific request code—of the device's choosing—that will be subsequently be used as the request code for the host-specific device request.

Once this request code is obtained, it is used in a subsequent phase 102 to initiate the host-specified device request. Specifically, the host specifies the request code as the bRequest value in a control transfer (see the "Background" section for details regarding a control transfer). The actual protocol of this device request (meanings of bIndex, bValue, etc.) is as specified in the definition of the host-specific device request. Phase 102 is repeated as desired during subsequent operation, without repetition of initialization phase 100.

Figure 3:
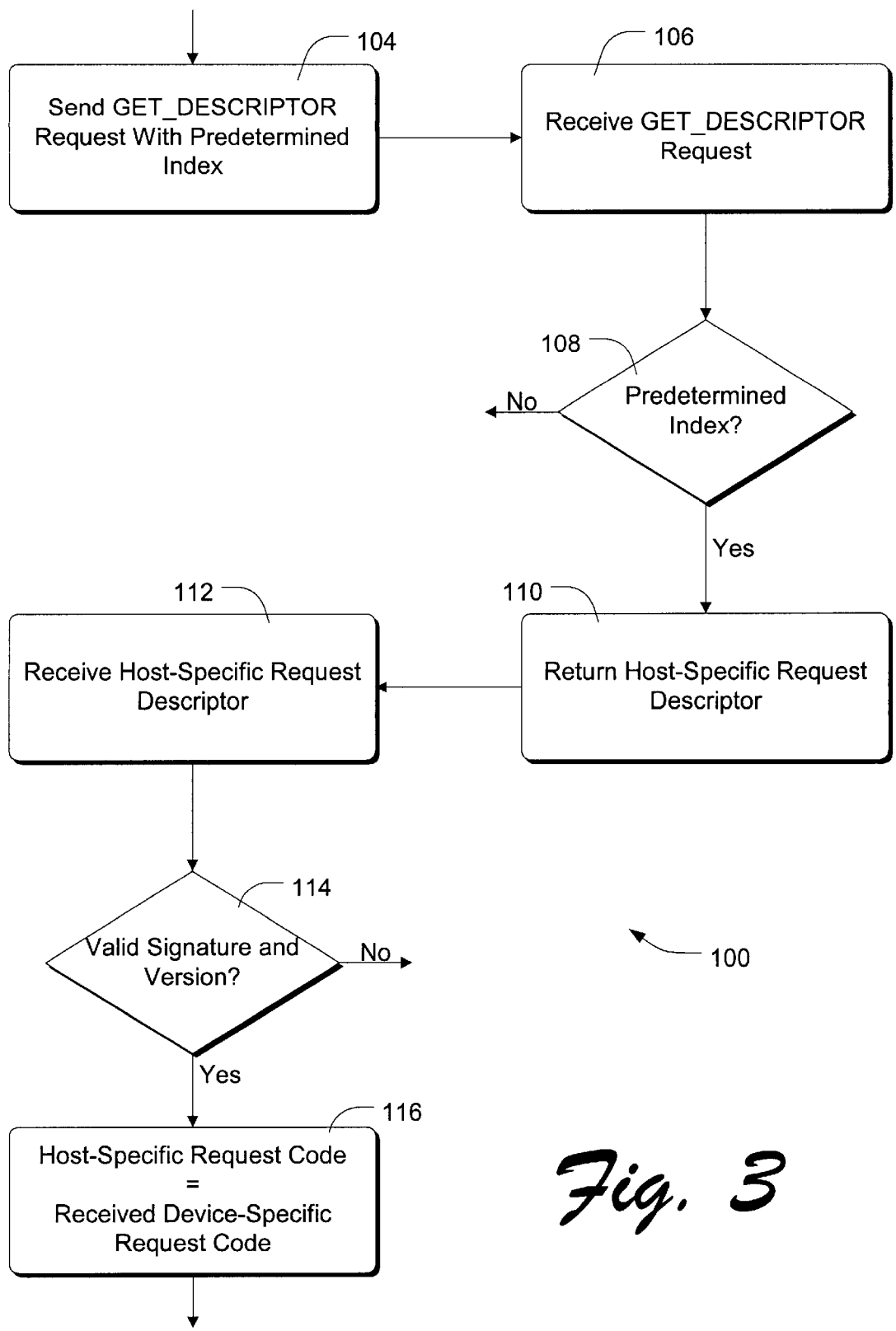

FIG. 3 shows more details regarding the initialization phase 100. Actions performed by the host are on the left, and actions performed by the device are on the right.

The host performs an action 104 of sending a GET_DESCRIPTOR device request to the peripheral device. The GET_DESCRIPTOR device request is a standard, USB-specific request, identified in a control transfer by the GET_DESCRIPTOR request code (bRequest=GET_DESCRIPTOR). The fields of the control transfer (discussed above in the background section) have values as follows:

bmRequestType=10000000 (binary), indicating a "device-to-host" transfer, a "standard" or "USB-specific" type request, and a device recipient.

bRequest=GET_DESCRIPTOR. This is a constant (six) defined by the USB specification wValue=03EE (hex). The high byte (03) indicates that the request is for a "string" descriptor, and the low byte is an index value that is predefined as a constant in the definition of the host-specified device request. In this example, it has been defined as EE (hex), but could be predefined as any other value.

wIndex=0.

wLength=12 (hex). This is the length of a host-specific request descriptor that will be returned in response to this request. In the described example, the length is 12 (hex).

data—returned host-specific request descriptor.

A compatible USB device is configured to respond to a request such as this (where wValue=03EE (hex)) by returning a host-specific request descriptor. This descriptor is not defined by the USB standard, but has fields as defined in the following discussion. The host-specific request descriptor designates a device-specific request code that will work on this device to initiate the host-specific request code. In other words, the manufacturer of the device can select any device-specific request code, and associate it with an implementation of the host-specific device request.

More specifically, the device receives the GET_DESCRIPTOR device request (block 106 of FIG. 3) and performs a decision 108 regarding whether the index value (the second byte of wValue) corresponds to the predetermined value (EE (hex)). This predetermined value is a value that is chosen to be used specifically for this purpose.

If the index value does not correspond to the predetermined value, the device responds in an appropriate way, usually by returning some other descriptor that corresponds to the index value. If the index value does correspond to the predetermined value, an action 110 is performed of returning the host-specific request descriptor to the host.

The host-specific request descriptor contains the following fields:

bLength—the length of the descriptor (12 (hex) in this example).

bDescriptorType—the type of descriptor (string type in this example).

qwSignature—a signature confirming that this descriptor is indeed a descriptor of the type requested. The signature optionally incorporates a version number. For example, in the described example MSFT100 indicates that this descriptor is for an "MSFT" host-specific device request, version "100" or 1.00.

bVendorCode—the device-specific request code that is to be associated with the host-specified device request.

bPad—a pad field of one byte.

The host receives the host-specific request descriptor (block 112) and then performs an action 114 of checking or verifying the signature and version number found in the qwSignature field. The correct signature confirms that the device is configured to support host-specific request codes. If either the signature or version number are incorrect, the host assumes that the device does not support host-specific request codes, and no further attempts are made to use this feature.

The signature field of the host-specific request descriptor block is what provides backward compatibility. A non-compatible device (one that doesn't support host-specific request codes) might use the predetermined wValue 03EE (hex) to store some other string descriptor, which will be returned to the host without any indication of problems. However, this will become apparent to the host after it examines the data in the location where the signature is supposed to be. If the signature is not found, the host knows that the returned descriptor is not of the type requested, and will assume that the device does not support host-specific request codes.

If the signature and version are confirmed in block 114, the host reads the device-specific request code from the bVendorCode field, and uses it in the future as a host-specific request code, to initiate the host-specific device request. When using the device, the host sends the host-specific device request by specifying the obtained device-specific request code as part of a control transfer. The device responds by performing one or more predefined actions or functions that correspond to the host-specific device request, in accordance with the specification of the host-specific device request.

The host-specific device request itself is in the format of a normal USB control transfer, including the fields discussed in the "Background" section above. The bRequest field is set to the value of the bVendorCode field of the host-specific request descriptor, which was earlier obtained from the peripheral device. The bmRequestType field is set to 11000001 (binary), indicating a device-to-host data transfer, a "vendor" or device-specific request type, and a device recipient.

The wValue and wIndex fields are used as defined by the definition of the host-specific device request. The wLength field indicates the number of bytes to transfer if there is a subsequent data transfer phase in the device request.

In a current implementation of this system, the host-specific device request is used to request one of a plurality of available host-defined string descriptors from the device. The wIndex field of the host-specific device request indicates which of the plurality of strings are to be returned. The device returns the descriptor referred to by wIndex.

The techniques described above allow an operating system designer to specify informational descriptors that devices can implement to provide additional data about themselves—data that is not directly addressed by the USB specification. Such data might relate to power management, special features, and overall device layout, as well as to the genre information discussed above. The techniques provide these advantages while retaining backward compatibility and without requiring changes to the USB specification.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

What is claimed is:

1. In a USB device that responds to device requests from a host, the device requests including USB-specific device requests with corresponding USB-specified request codes and device-specific device requests with corresponding device-specified request codes, the USB-specific device requests including a GET_DESCRIPTOR device request with a corresponding GET_DESCRIPTOR request code, a method of implementing a host-specific device request comprising:

receiving a GET_DESCRIPTOR device request that specifies a predetermined index;

responding to the GET_DESCRIPTOR device request by returning a device-specific request code that corresponds in the USB device to the host-specific device request;

receiving the host-specific device request, specified by the returned device-specific request code; and responding to the host-specific device request with one or more predefined actions that correspond to the host-specific device request.

2. A method as recited in claim 1, wherein the host-specific device request indicates one of a plurality of available descriptors that is to be returned from the USB device in response to the host-specific device request, the method further comprising returning said one of a plurality of available descriptors in response to the host-specific device request.

3. A method as recited in claim 1, wherein the device-specific request code is returned in a host-specific request descriptor comprising:

a length field;

a type field;

a signature field containing a signature, the signature confirming the validity of the host-specific request descriptor; and a request code field indicating the device-specific request code.

4. A method as recited in claim 1, wherein the host-specific device request is received in a format that comprises:

a request type field indicating that the device request is a device-specific type of request;

a request code field containing the returned device-specific request code;

a value field indicating an interface number and an extended descriptor size;

an index field that specifies a particular one of a plurality of available functions available through the host-specific device request; and a length field indicating the length of data to be returned in response to the host-specific device request.

5. A method as recited in claim 1, wherein the device-specific request code is returned in a host-specific request descriptor, the method further comprising:

returning a signature in the host-specific request descriptor, the signature confirming the validity of the host-specific request descriptor.

6. A method as recited in claim 1, further comprising:

returning a signature with the device-specific request code, the signature confirming the validity of the device-specific request code.

7. A method as recited in claim 1, wherein the one or more predefined actions are specified in the host-specific device request.

8. One or more computer-readable media containing a computer-executable program that performs the method of claim 1.

9. In conjunction with a USB device that responds to device requests from a host, the device requests including USB-specific device requests with corresponding USB-specified request codes and device-specific device requests with corresponding device-specified request codes, the USB-specific device requests including a GET_DESCRIPTOR device request with a corresponding GET_DESCRIPTOR request code, a method of specifying a request code for a host-specific device request, comprising:

sending a GET_DESCRIPTOR device request to the USB device, the GET_DESCRIPTOR device request specifying a predetermined index; and in response to the GET_DESCRIPTOR device request, returning a device-specific request code from the USB device, wherein the returned device-specific request code corresponds in the USB device to the host-specific device request.

10. A method as recited in claim 9, further comprising:

sending the host-specific device request by specifying the returned device-specific request code; and in response to the host-specific device request, performing one or more predefined actions that correspond to the host-specific device request.

11. A method as recited in claim 9, further comprising sending the host-specific device request by specifying the returned device-specific request code.

12. A method as recited in claim 9, further comprising checking a signature that is returned in conjunction with the device-specific request code.

13. A method as recited in claim 9, further comprising:

returning a signature with the device-specific request code; and checking the returned signature to confirm the validity of the device-specific request code.

14. A method as recited in claim 9, further comprising:

returning a signature with the device-specific request code;

checking the returned signature to confirm the validity of the device-specific request code; and if the device-specific request code is valid, sending the host-specific device request by specifying the returned device-specific request code.

15. A method as recited in claim 9, wherein the device-specific request code is returned in a host-specific request descriptor comprising:

a length field;

a type field;

a signature field containing a signature, the signature confirming the validity of the host-specific request descriptor; and a request code field indicating the device-specific request code.

16. A method as recited in claim 9, wherein the host-specific device request is received in a format that comprises:

a request type field indicating that the device request is a device-specific type of request;

a request code field containing the returned device-specific request code;

a value field indicating an interface number and an extended descriptor size;

an index field that specifies a particular one of a plurality of available functions available through the host-specific device request; and a length field indicating the length of data to be returned in response to the host-specific device request.

17. A method as recited in claim 9, wherein the one or more predefined actions are specified in the host-specific device request.

18. One or more computer-readable media containing a computer-executable program that performs the method of claim 9.

19. One or more computer-readable media containing a computer-executable program for use in conjunction with a USB device that responds to device requests from the program, the device requests including USB-specific device requests with corresponding USB-specified request codes and device-specific device requests with corresponding device-specified request codes, the USB-specific device requests including a GET_DESCRIPTOR device request with a corresponding GET_DESCRIPTOR request code, the program comprising:

sending a request to the USB device for a device-specific request code;

receiving a device-specific request code from the USB device in response to the request, wherein the device-specific request code corresponds in the USB device to a host-specific device request; and subsequently sending the host-specific device request to the USB device by specifying the returned device-specific request code.

20. One or more computer-readable media as recited in claim 19, the program further comprising:

indicating, in the host-specific device request, one of a plurality of descriptors that is to be returned in response to the host-specific device request.

21. One or more computer-readable media as recited in claim 19, the program further comprising:

receiving a signature in response to sending request; and checking the signature to confirm validity of the returned device-specific request code before subsequently sending the host-specific device request to the USB device.

22. One or more computer-readable media as recited in claim 19, wherein the device-specific request code is returned in a host-specific request descriptor comprising:

a length field;

a type field;

a signature field containing a signature, the signature confirming the validity of the host-specific request descriptor; and a request code field indicating the device-specific request code.

23. One or more computer-readable media as recited in claim 19, wherein the host-specific device request is in a format comprising:

a request type field indicating that the device request is a device-specific type of request;

a request code field containing the returned device-specific request code;

a value field indicating an interface number and an extended descriptor size;

an index field that specifies a particular one of a plurality of available descriptors available through the host-specific device request; and a length field indicating the length of data to be returned in response to the host-specific device request.

24. A computer comprising one or more computer-readable media as recited in claim 19.

25. A USB device that responds to device requests from a host, the device requests including USB-specific device requests with corresponding USB-specified request codes and device-specific device requests with corresponding device-specified request codes, the USB-specific device requests including a GET_DESCRIPTOR device request with a corresponding GET_DESCRIPTOR request code, the USB device comprising:

a USB interface;

control logic that communicates with a host through the USB interface;

non-volatile memory accessible by the control logic;

a plurality of feature descriptors stored in the non-volatile memory;

the control logic being configured to perform acts comprising:

in response to receiving a GET_DESCRIPTOR device request that specifies a predetermined index, returning a device-specific request code that corresponds in the USB device to a host-specific device request; and returning one of the plurality of feature descriptors in response to receiving the host-specific device request, wherein the host-specific device request specifies said one of the plurality of feature descriptors.

26. A USB device as recited in claim 25, wherein the device-specific request code is returned in a host-specific request descriptor comprising:

a length field;

a type field;

a signature field containing a signature, the signature confirming the validity of the host-specific request descriptor; and a request code field indicating the device-specific request code.

27. A USB device as recited in claim 25, wherein the host-specific device request is received in a format that comprises:

a request type field indicating that the device request is a device-specific type of request;

a request code field containing the returned device-specific request code;

a value field indicating an interface number and an extended descriptor size;

an index field that specifies said one of the plurality of feature descriptors; and a length field indicating the length of data to be returned in response to the host-specific device request.

28. A USB device as recited in claim 25, the control logic being configured to perform a further action comprising:

in response to receiving the host-specific device request, returning a signature with the device-specific request code, the signature confirming the validity of the device-specific request code.

* * * * *

UNITED STATES PATENT AND TRADEMARK OFFICE
CERTIFICATE OF CORRECTION

PATENT NO. : 6,484,219 B1
DATED : November 19, 2002
INVENTOR(S) : Dunn et al.

It is certified that error appears in the above-identified patent and that said Letters Patent is hereby corrected as shown below:

Column 2,
Line 45, replace "Jan. 10, 2000" with -- Jan. 14, 2000 --.

Signed and Sealed this

Fourth Day of May, 2004

JON W. DUDAS
*Acting Director of the United States Patent and Trademark Office*